(12) United States Patent
Fukuman et al.

(10) Patent No.: US 11,001,255 B2
(45) Date of Patent: May 11, 2021

(54) DRIVING ASSISTANCE APPARATUS AND DRIVING ASSISTANCE METHOD

(71) Applicants: DENSO CORPORATION, Kariya (JP); TOYOTA JIDOSHA KABUSHIKI KAISHA, Toyota (JP)

(72) Inventors: Masumi Fukuman, Kariya (JP); Akihiro Kida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 15/740,617

(22) PCT Filed: Jun. 21, 2016

(86) PCT No.: PCT/JP2016/068391
§ 371 (c)(1),
(2) Date: Dec. 28, 2017

(87) PCT Pub. No.: WO2017/002669
PCT Pub. Date: Jan. 5, 2017

(65) Prior Publication Data
US 2018/0170368 A1    Jun. 21, 2018

(30) Foreign Application Priority Data
Jun. 30, 2015    (JP) .............................. JP2015-131132

(51) Int. Cl.
*B60W 30/08* (2012.01)
*B60W 30/17* (2020.01)
(Continued)

(52) U.S. Cl.
CPC ............ *B60W 30/08* (2013.01); *B60W 30/09* (2013.01); *B60W 30/17* (2013.01);
(Continued)

(58) Field of Classification Search
CPC ................. B60W 30/08; B60W 30/09; B60W 30/18036; B60W 50/10; B60W 30/18063;
(Continued)

(56) References Cited

U.S. PATENT DOCUMENTS

| 2004/0030497 A1 | 2/2004 | Knoop et al. |
| 2006/0287800 A1 | 12/2006 | Watanabe et al. |
| 2015/0120086 A1 * | 4/2015 | Endo ..................... B60W 30/08 |
| | | 701/1 |

FOREIGN PATENT DOCUMENTS

| EP | 2098844 A1 * | 9/2009 | ........... B62D 15/027 |
| JP | 2004-050925 A | 2/2004 | |

(Continued)

OTHER PUBLICATIONS

English Translation_JP 2004050925 (Year: 2004).*
(Continued)

*Primary Examiner* — Peter D Nolan
*Assistant Examiner* — Ashley L Redhead, Jr.
(74) *Attorney, Agent, or Firm* — Maschoff Brennan (57) ABSTRACT

A driving assistance apparatus operates a collision avoidance apparatus that is mounted in a vehicle based on a distance to an object that is positioned ahead of the vehicle in a travelling direction. The driving assistance apparatus includes: a resistance determining unit that determines whether or not running resistance that suppresses rolling of wheels forward in the travelling direction of the vehicle is present; an operation determining unit that determines whether or not an accelerator operation by a driver of the vehicle is being performed; and a distance setting unit that sets an operation distance that is a distance at which the collision avoidance apparatus is operated. When the resistance determining unit determines that the running resistance is present and when the operation determining unit determines that the accelerator operation is being performed,
(Continued)

the distance setting unit sets the operation distance to a value that is less than that when the running resistance is not present.

15 Claims, 4 Drawing Sheets

(51) Int. Cl.
  *G08G 1/16* (2006.01)
  *B60W 30/18* (2012.01)
  *B60W 30/09* (2012.01)
  *B60W 50/10* (2012.01)
(52) U.S. Cl.
  CPC ............. *B60W 30/18036* (2013.01); *B60W 30/18063* (2013.01); *B60W 50/10* (2013.01); *G08G 1/168* (2013.01); *B60W 2520/10* (2013.01); *B60W 2530/16* (2013.01); *B60W 2540/10* (2013.01); *B60W 2552/15* (2020.02); *B60W 2552/35* (2020.02); *B60W 2554/00* (2020.02)
(58) Field of Classification Search
  CPC ........... B60W 30/17; B60W 2550/142; B60W 2550/147; B60W 2550/10; B60W 2530/16; B60W 2540/10; B60W 2520/10; G08G 1/168
  See application file for complete search history.

(56) References Cited

FOREIGN PATENT DOCUMENTS

| | | | | |
|---|---|---|---|---|
| JP | 2004050925 A | * | 2/2004 | |
| JP | 2005-231588 A | | 9/2005 | |
| JP | 2006-347428 A | | 12/2006 | |
| JP | 2006347428 A | * | 12/2006 | ......... B62D 15/0275 |
| JP | 2008-150032 A | | 7/2008 | |
| JP | 2008150032 A | * | 7/2008 | ............... B60T 7/22 |
| JP | 2014-091351 A | | 5/2014 | |

OTHER PUBLICATIONS

English Translation_JP 2006347428A (Year: 2006).*
English Translation_JP 2008150032 (Year: 2008).*
English_Translation_EP2098844 (Year: 2009).*

* cited by examiner

DRIVING ASSISTANCE APPARATUS AND DRIVING ASSISTANCE METHOD

CROSS-REFERENCE TO RELATED APPLICATIONS

The present application is based on and claims the benefit of priority from Japanese Patent Application No. 2015-131132, filed on Jun. 30, 2015, the descriptions of which are incorporated herein by reference.

TECHNICAL FIELD

The present disclosure relates to a driving assistance apparatus that detects an object present in a travelling direction of a vehicle and controls the vehicle, and a driving assistance method performed by the driving assistance apparatus.

BACKGROUND ART

Conventionally, a driving assistance apparatus in which a distance measurement sensor, such as an ultrasonic wave sensor, is mounted in a vehicle and the driving assistance apparatus detects an object, such as a leading vehicle, a pedestrian, or a structure on a road, present in the periphery of the vehicle using the distance measurement sensor is proposed. The driving assistance apparatus performs various types of control to improve traveling safety of the vehicle, such as operation of a braking apparatus and notification to a driver, based on an object detection result from the distance measurement sensor.

In a vehicle in which a driving assistance apparatus such as this is mounted, during parking or the like, the vehicle may be determined to be excessively close to an object even in cases in which a driver wishes to approach an object. An unnecessary operation may thereby be performed. Therefore, a distance to which the vehicle is able to approach an object is required to be set based on an intention of the driver. In this regard, as an apparatus that enables the driver to set a target value for the distance to an object, there is a driving assistance apparatus described in PTL 1.

CITATION LIST

Patent Literature

[PTL 1] JP-A-2014-91351

SUMMARY OF INVENTION

Technical Problem

In the driving assistance apparatus described in PTL 1, although the driver is able to input the target value for distance, the distance is uniformly set. In addition, the driver does not necessarily input the distance upon determining conditions. Therefore, it cannot be said that driving assistance based on an operation intention of the driver is necessarily possible.

The main object of the present disclosure is to provide a driving assistance apparatus that is capable of appropriately setting a distance at which to operate a collision avoidance apparatus, based on an operation by a driver, and a driving assistance method.

Solution to Problem

A first aspect of the present disclosure is a driving assistance apparatus that operates a collision avoidance apparatus that is mounted in a vehicle based on a distance to an object that is positioned ahead of the vehicle in a travelling direction. The driving assistance apparatus includes: a resistance determining unit that determines whether or not running resistance that suppresses rolling of wheels forward in the travelling direction of the vehicle is present; an operation determining unit that determines whether or not an accelerator operation by a driver of the vehicle is being performed; and a distance setting unit that sets an operation distance that is a distance at which the collision avoidance apparatus is operated. When the resistance determining unit determines that the running resistance is present and when the operation determining unit determines that the accelerator operation is being performed, the distance setting unit sets the operation distance to a value that is less than that when the running resistance is not present.

On a flat road surface, the vehicle can be moved by a creep operation. Therefore, when the vehicle is moved closer to an object, the driver performs a brake operation rather than an accelerator operation. In this case, when the driver performs the accelerator operation, there is a likelihood that the accelerator operation is an erroneous depression. Therefore, the vehicle is required to be more quickly stopped. Meanwhile, in cases in which the running resistance is present on the road surface, such as when the road is an uphill road or a bump is present, the vehicle cannot be moved by the creep operation. Therefore, the driver moves the vehicle by an accelerator operation and approaches the object. At this time, when the accelerator operation by the driver is determined to be an erroneous depression in a manner similar to that in the case of the flat road surface, the vehicle cannot be moved closer to the object as a result of operation of the collision avoidance apparatus. Consequently, the driver experiences irritation.

In this regard, in the above-described configuration, when the running resistance is determined to be present and the accelerator operation by the driver is determined to be performed, the operation distance that is the distance at which the collision avoidance apparatus is operated is set to a smaller value. As a result, in a state in which the driver is approaching an object by an accelerator operation, operation of the collision avoidance apparatus being performed at an early stage can be suppressed. Consequently, driving assistance based on the intention of the driver becomes possible.

BRIEF DESCRIPTION OF DRAWINGS

The above-described object, other objects, characteristics, and advantages of the present disclosure will be clarified through the detailed description below, with reference to the accompanying drawings. In the drawings.

DESCRIPTION OF EMBODIMENTS

An embodiment actualized as a driving assistance apparatus that is mounted in a vehicle will hereinafter be described with reference to the drawings. The driving assistance apparatus according to the present embodiment receives detection information of an object from a distance measurement sensor. The vehicle control apparatus thereby detects another vehicle, a road structure, or the like as an object present in the periphery of the vehicle. First, an overall configuration of the driving assistance apparatus of the vehicle according to the present embodiment will be described with reference to FIG. 1.

Figure 1:
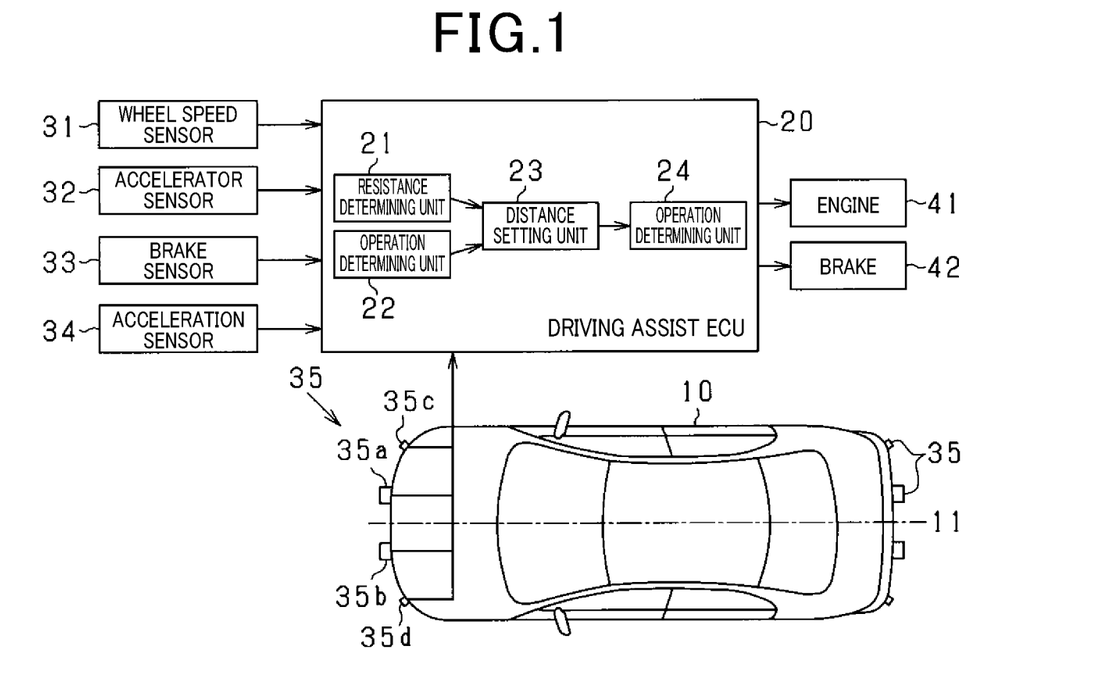
FIG. 1 is a schematic diagram of a driving assistance apparatus.

In FIG. 1, a vehicle 10 includes a driving assistance electronic control unit (ECU) 20 that is the driving assistance apparatus. The vehicle 10 includes a wheel speed sensor 31, an accelerator sensor 32, a brake sensor 33, an acceleration sensor 34, and a distance measurement sensor 35 as sensors. The sensors 31 to 35 are connected to the driving assistance ECU 20. The driving assistance ECU 20 receives signals from the sensors 31 to 35, and performs collision avoidance control by transmitting a control signal to a brake 42. At this time, the brake 42 functions as a collision avoidance apparatus based on a command from the driving assistance ECU 20.

A microcomputer, an interface for a wire harness, and the like are mounted in the driving assistance ECU 20. The microcomputer has a publicly known configuration that includes a central processing unit (CPU), a read-only memory (ROM), a random access memory (RAM), an input/output (I/O) module, a controller area network (CAN) communication apparatus, and the like.

The wheel speed sensor 31 is a pulse detection type that outputs pulse signals at a predetermined cycle. According to the present embodiment, an electromagnetic pickup type that outputs the pulse signals at the predetermined cycle based on passage of a plurality of protruding portions provided on a rotor that rotates with a wheel is used. The driving assistance ECU 20 receives detection signals from the wheel speed sensor 31 and calculates a vehicle speed based on a pulse interval of the inputted detection signals.

The accelerator sensor 32 is a sensor that detects a depression amount of an accelerator pedal. The driving assistance ECU 20 receives a detection signal from the accelerator sensor 32 and determines required torque (required amount of air). The driving assistance ECU 20 then transmits a control signal to the engine 41 based on the required torque. The brake sensor 33 is a sensor that detects a depression amount of a brake pedal. The driving assistance ECU 20 receives a detection signal from the brake sensor 33 and transmits a control signal to the brake 42.

The acceleration sensor 34 detects acceleration of the vehicle 10 based on force applied to the sensor itself. For example, a capacitance type or a piezoresistive type is used. In the acceleration sensor 34, acceleration in a state in which the vehicle 10 is stopped on a flat road surface and gravitational acceleration vertically acts on the vehicle 10 serves as reference. That is, in a state in which the vehicle 10 is stopped on a sloped road surface with a slope direction in a vehicle travelling direction, acceleration in the travelling direction of the vehicle 10 based on the slope angle is detected. The acceleration detected by the acceleration sensor 34 is inputted to the driving assistance ECU 20.

For example, the distance measurement sensor 35 is an ultrasonic wave sensor. The distance measurement sensor 35 provides a function for transmitting ultrasonic waves of 20 kHz to 100 kHz as probing waves and a function for receiving probing waves reflected by an object as reflected waves. According to the present embodiment, four distance measurement sensors 35 are attached to a vehicle front portion (such as a front bumper) with predetermined space therebetween, such as to be arrayed in a direction (vehicle width direction) perpendicular to the travelling direction of the vehicle 10. Specifically, the distance measurement sensors 35 include two center sensors (first sensor 35a and second sensor 35b) that are attached near a center line 11 of the vehicle 10, in symmetrical positions with respect to the center line 11, and corner sensors 35c and 35d that are respectively attached to a left corner and a right corner of the vehicle 10. In the vehicle 10, the distance measurement sensors 35 are also attached to a vehicle rear portion (such as a rear bumper). However, because the attachment positions and functions of the sensors are identical to those of the distance measurement sensors 35 in the vehicle front portion, descriptions thereof are omitted herein.

The driving assistance ECU 20 detects whether or not an object in the periphery of the vehicle 10 is present based on the detection information of an object received from the distance measurement sensor 35. Specifically, the driving assistance ECU 20 transmits a control signal to the distance measurement sensor 35 and commands the distance measurement sensor 35 to transmit the probing waves at each transmission opportunity at a predetermined time interval (such as an interval of several hundred milliseconds). Next, upon receiving the detection information of an object from the distance measurement sensor 35, the driving assistance ECU 20 determines whether or not an object in the periphery of the vehicle 10 is present based on the received detection information. Then, when an object is determined to be present ahead of the vehicle 10 in the travelling direction, a distance setting unit 23 sets a reference value as an operation distance to avoid a collision with the object. The operation distance is a distance at which the brake 42 is operated. An operation determining unit 24 determines whether or not the distance between the vehicle 10 and the object is less than the operation distance. When the distance between the vehicle 10 and the object is less than the operation distance, the operation determining unit 24 transmits a command to operate the brake 42. At this time, control to suppress driving force may be simultaneously performed on the engine 41 as well.

The driving force of the engine 41 is transmitted to a wheel of the vehicle 10 via an automatic transmission. In the automatic transmission, a torque converter is used in a clutch mechanism. The transmission of the driving force to the wheel cannot be completely interrupted. Therefore, even when an accelerator operation by the driver is not being performed during low-speed travel, the driving force from the engine 41 is transmitted to the wheel and creeping occurs.

According to the present embodiment, when the vehicle 10 is traveling at a low speed, the distance measurement sensor 35 detects an object, such as another vehicle, a wall, or a column, present at a distance that is relatively near the vehicle 10 (such as within 5 m), and collision avoidance regarding the obstacle is performed. For example, the function is provided when the vehicle 10 is parked.

When the vehicle 10 travels at a low speed, the operation by the driver differs depending on whether or not running resistance that suppresses rolling of the wheels is present. Specifically, the vehicle 10 can be moved by the creep operation on a flat road surface in which the running resistance is not present. Therefore, when the vehicle 10 is moved closer to an object, the driver performs a brake operation rather than an accelerator operation. In this case, when the driver performs the accelerator operation, there is a likelihood that the accelerator operation is an erroneous depression. Therefore, the vehicle 10 is required to be more quickly stopped.

Figure 2:
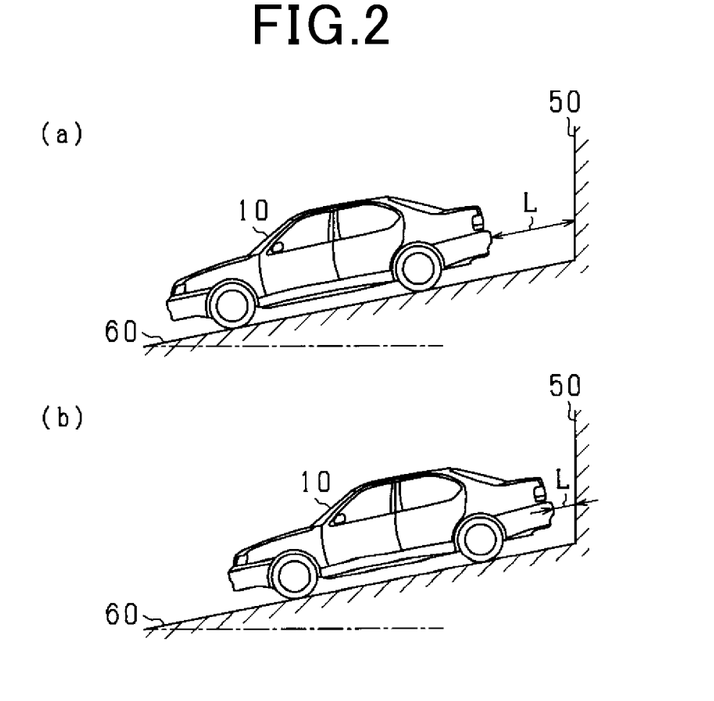
FIG. 2 is a diagram showing a state in which a vehicle approaches a wall on an uphill road.

Meanwhile, when the running resistance is present on the road surface, the vehicle 10 cannot be moved by the creep operation. A case in which the running resistance is present will be described with reference to FIGS. 2 and 3. When the vehicle 10 climbs a sloped road surface 60 (uphill road) and approaches a wall 50 as shown in FIG. 2, the vehicle 10 is moved by the accelerator pedal being depressed. At this time, when the accelerator operation is determined to be an erroneous depression, the operation distance is set to be greater. As shown in FIG. 2 by (a), the brake 42 is operated in a state in which a distance L between the vehicle 10 and the wall 50 is great. In this regard, when the accelerator operation by the driver is performed in cases in which the road surface 60 on which the vehicle 10 is positioned is an uphill road, the vehicle 10 can be moved closer to the wall 50 should the operation distance be set to be less than the reference value, as shown in FIG. 2 by (b).

Figure 3:
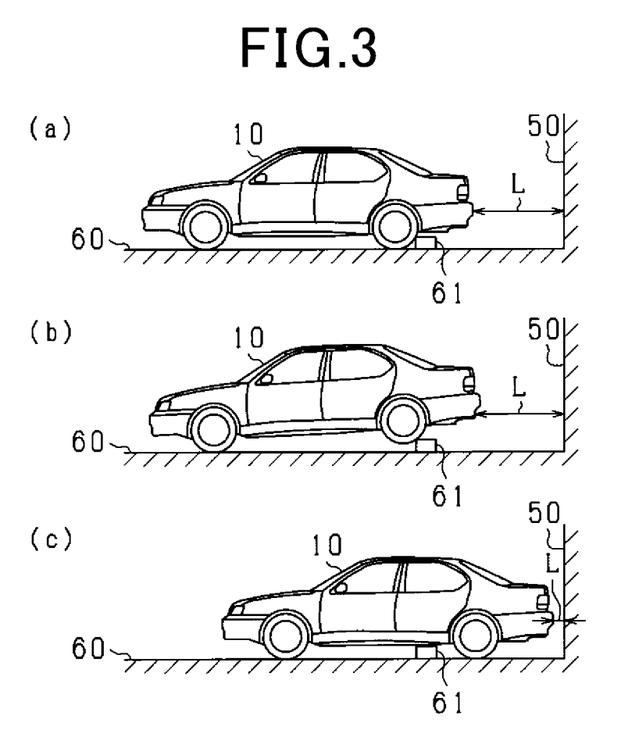
FIG. 3 is a diagram showing a state in which the vehicle traverses a bump and approaches a wall.

In a similar manner, when a bump 61 is present on the road surface, as shown in FIG. 3 by (a), the vehicle 10 temporarily stops upon coming into contact with the bump 61. At this time, as a result of the driver depressing the accelerator pedal, as shown in FIG. 3 by (b), the vehicle 10 runs onto the bump 61. Then, as a result of depression of the accelerator pedal being continued, as shown in FIG. 3 by (c), the vehicle 10 can be moved closer to the wall 50. At this time, when the accelerator operation is determined to be an erroneous depression, the operation distance is set to be a greater value. Therefore, as shown in FIG. 3 by (a) and (b), the brake 42 is operated in a state in which the distance L between the vehicle 10 and the wall 50 is great. A case in which the vehicle cannot sufficiently approach the wall 50 or a case in which the vehicle 10 cannot traverse the bump 61 may occur.

Therefore, according to the present embodiment, a resistance determining unit 21 of the driving assistance ECU 20 determines whether or not running resistance is present on the road surface 60. An operation determining unit 22 determines whether or not an accelerator operation by the driver is performed. Then, when the running resistance is determined to be present on the road surface 60 and the accelerator operation by the driver is determined to be performed, a distance setting unit 23 sets the operation distance to a correction value that is a value less than the reference value. Approaching the object becomes possible.

Cases in which the running resistance is present on the road surface 60 are mainly cases in which the vehicle 10 travels uphill as shown in FIG. 2 or cases in which the bump 61 is present on the road surface 60 as shown in FIG. 3. Therefore, whether or not the running resistance is present is determined using the detection values of the sensors 31 to 34.

Specifically, in cases in which the vehicle 10 travels uphill, when the vehicle 10 starts to move as a result of an accelerator operation by the driver from a stopped state, the road is determined to be an uphill road based on the detection value of the acceleration sensor 34 in the stopped state, and the determination result is held. In addition, whether or not the road is an uphill road may be determined using a time-derivative value of the detection value of the wheel speed sensor 31 and the detection value of the acceleration sensor 34.

In cases in which the running resistance is the bump 61, as described above, the vehicle 10 temporarily stops as a result of coming into contact with the bump 61. Therefore, when a state in which the vehicle 10 cannot move regardless of the accelerator operation being detected continues for a predetermined period, a determination is made that the bump 61 is present as the running resistance. Whether or not the state in which the vehicle 10 cannot move has continued for a predetermined period may be determined by at least either of the detection value of the acceleration sensor 34 and the detection value of the wheel sensor 31.

Here, when an excessive accelerator operation by the driver is performed in cases in which the running resistance is present, the risk of the vehicle 10 coming into contact with the object increases. Therefore, a threshold is provided for an operating amount (accelerator position) detected by the accelerator sensor 32. When the operating amount (accelerator position) exceeds the threshold, the operation distance is set to the reference value. In addition, when the vehicle 10 is moved on an uphill road, the driver is required to increase the operating amount (accelerator position) of the accelerator pedal as the slope of the road surface 60 increases. Therefore, a gradient is determined based on the detection value of the accelerator sensor 34 and the threshold to be compared to the accelerator position is set to be greater as the gradient increases.

Figure 4:
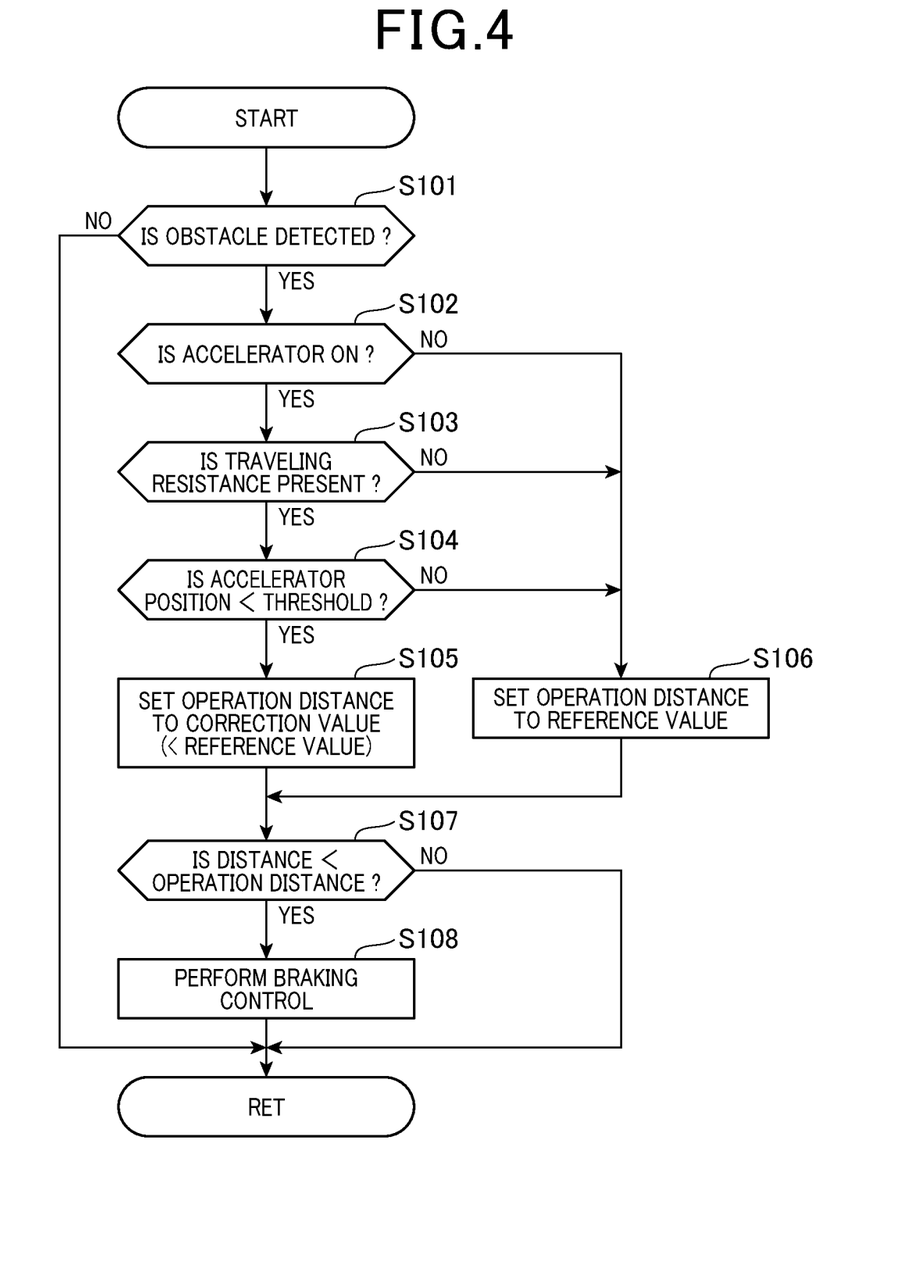
FIG. 4 is a flowchart showing processes according to an embodiment.

FIG. 4 is a flowchart of a series of processes performed by the driving assistance ECU 20 according to the present embodiment. The processes in FIG. 4 are repeatedly performed at every predetermined control cycle.

First, whether or not an object (obstacle) is detected is determined (S101). When an obstacle is not detected (NO at S101), the brake 42 is not required to be operated. Therefore, the series of processes is ended. When the obstacle is detected (YES at S101), the operation determining unit 22 determines whether or not an accelerator operation by the driver is performed (S102). When the accelerator operation by the driver is not performed (NO at S102), it can be said that the driver is not performing an operation to approach the obstacle. Therefore, the operation distance is set to the reference value (S106). When the accelerator operation by the driver is performed (YES at S102), the resistance determining unit 21 determines whether or not running resistance is present.

When the running resistance is not present (NO at S103), the accelerator operation is not required for approaching the obstacle. Therefore, a likelihood of an erroneous depression of the accelerator pedal by the driver is present. Consequently, the distance setting unit 23 sets the operation distance to the reference value (S106). When the running resistance is present (YES at S103), whether or not the accelerator position is less than the threshold is determined (S104). When the accelerator position is equal to or greater than the threshold (NO at S104), a likelihood of the vehicle 10 suddenly accelerating or the vehicle speed becoming excessive is present. Therefore, the operation distance is set to the reference value (S106). When the accelerator position is less than the threshold (YES at S104), the likelihood of the operation to approach the obstacle by the driver is high. Therefore, the distance setting unit 23 sets the operation distance to the correction value that is a value less than the reference value (S105).

When the operation distance is determined at either of the process at S105 and the process at S106, whether or not the distance to the obstacle is less than the operation distance is determined (S107). When the distance to the obstacle is less than the operation distance (YES at S107), the brake 42 is operated and braking control is performed (S108). Meanwhile, when the distance to the obstacle is greater than the operation distance (NO at S107), the series of processes is immediately ended.

As a result of the above-described configuration, the driving assistance apparatus according to the present embodiment achieves the following effects.

When running resistance is determined to be present and an accelerator operation by the driver is determined to be performed, the operation distance for the brake 42 is set to a value that is less than the reference value. As a result, in a state in which the driver is approaching an object by an accelerator operation, operation of the collision avoidance apparatus being performed at an early stage can be suppressed. Consequently, driving assistance based on the intention of the driver becomes possible.

When running resistance is not present, a likelihood that the accelerator operation by the driver is an erroneous operation is present. In the above-described configuration, when the running resistance is not present, the operation distance for the brake 42 is set to the reference value rather than the correction value. Therefore, when erroneous operation of the accelerator pedal by the driver occurs, the brake 42 can be operated at an appropriate distance.

Even when the running resistance is present, should the accelerator operation by the driver be excessive, a likelihood that the vehicle 10 suddenly accelerates and comes into contact with the object is present. In the above-described configuration, a threshold is provided for the operating amount (accelerator position) detected by the accelerator sensor 32. When the operating amount (accelerator position) is less than the threshold, the operation distance is set to a value that is less than the reference value. Therefore, the operation distance can be set to be smaller such as to be limited to cases in which the operation by the driver is an operation to approach the object.

When the vehicle 10 is moved on an uphill road, the accelerator position is required to be set to be greater as the gradient of the road surface increases. In the above-described configuration, the threshold to be compared to the accelerator position is set to be greater as the gradient of the road surface increases. Therefore, in a state in which the gradient of the road surface is great, erroneous determination that the accelerator operation by the driver is an erroneous depression can be suppressed.

VARIATION EXAMPLES

According to the above-described embodiment, when the running resistance is present and an accelerator operation is performed, the operation distance is set to be less than the reference value. In this regard, the process to set the operation distance to be less than the reference value may also be performed for a flat road. Specifically, on a flat road, the driver approaches the object by a brake operation rather than an accelerator operation. Therefore, the operation distance may be set to be smaller as a result of the brake operation being detected.

When the vehicle 10 travels on an uphill road, the vehicle speed detected by the wheel sensor 31 is less than a speed corresponding to the operating amount (accelerator position) of the accelerator pedal by the driver. In addition, when the vehicle 10 traverses the bump 61 on the road surface 60, even should the vehicle 10 traverse the bump 61 without stopping at the bump 61, the vehicle speed detected by the wheel speed sensor 31 is less than the speed corresponding to the accelerator operation by the driver. Therefore, according to the above-described embodiment, the speed and the operating amount (accelerator position) detected by the accelerator sensor 32 may be associated. When an actual measurement value of the vehicle speed acquired from the wheel speed sensor 31 is less than the vehicle speed corresponding to the accelerator position, the running resistance may be determined to be present.

According to the above-described embodiment, as examples of cases in which running resistance is present, a case in which the road is an uphill road and a case in which a bump is present on a road surface are given. However, cases in which the running resistance is present are not limited thereto. For example, in cases in which the road is an unpaved road, pebbles and gravel are scattered on the road surface, or the like, traveling by the creep operation may not be possible. In cases such as these as well, the running resistance may be determined to be present in a manner similar to that according to the above-described embodiment. In this case, for example, the determination regarding whether or not the running resistance is present may be made based on the relationship between the accelerator position and the vehicle speed, described above.

According to the above-described embodiment, the torque converter is used to transmit the driving force from the engine 41 to the wheel, and as a result, creeping occurs. In this regard, a continuously variable transmission may be used for transmission of power, instead of the torque converter. In addition, effects similar to those according to the above-described embodiment can be achieved should a transmission mechanism be provided with a function for generating the creep operation, even when the transmission mechanism is able to block transmission of the driving force from the engine 41 to the wheel.

According to the above-described embodiment, the brake 42 is operated as the collision avoidance apparatus. However, a speaker that is mounted in the vehicle 10 may be used as the collision avoidance apparatus. Specifically, when the distance between the vehicle 10 and the object becomes less than the operation distance, a warning sound to the driver may be generated, and a braking operation by the driver may be prompted. The brake 41 and the speaker may both be used as the collision avoidance apparatus. In this case, the operation distances for the brake and the speaker may be the same or may differ.

According to the above-described embodiment, the engine 41 serves as a drive source of the vehicle 10. However, application to a vehicle in which a motor serves as the drive source is also similarly possible.

According to the above-described embodiment, in the driving assistance ECU 20 that is the driving assistance apparatus, a program is stored in the ROM that corresponds to a non-transitory tangible recording medium. The functions of the driving assistance apparatus are actualized as a result of the CPU that corresponds to a processor of a computer running the program. However, a configuration in which the program is stored in a non-transitory tangible recording medium other than the ROM (such as a non-volatile memory other than the ROM) and a processor such as the CPU runs the program is also possible. In this case, a configuration in which, as a result of the processor running the program stored in the non-transitory tangible recording medium, a method (such as a driving assistance method) corresponding to the program is performed in the driving assistance apparatus is also possible.

In addition, some or all of the functions provided by the driving assistance apparatus may be configured as hardware by a single or a plurality of integrated circuits (that is, ICs), or the like. Furthermore, each unit (such as the resistance determining unit 21, the operation determining unit 22, and the distance setting unit 23) of the driving assistance ECU 20 provided by the driving assistance apparatus may be provided by software recorded in a non-transitory tangible recording medium, such as a non-volatile memory, and a computer that runs the software, by the software alone, by hardware alone, or by a combination thereof While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. A driving assistance apparatus that operates a collision avoidance apparatus that is mounted to a vehicle based on a distance to an object that is positioned ahead of the vehicle in a travelling direction, the driving assistance apparatus comprising:
a processor programmed to:
determine whether running resistance that suppresses rolling of wheels forward in the travelling direction of the vehicle is present;
determine whether an accelerator operation by a driver of the vehicle is being performed; and
set an operation distance that is a distance at which the collision avoidance apparatus is operated, wherein
the processor sets the operation distance to a reference value in response to the processor determining that the running resistance is not present, and sets the operation distance to a correction value that is less than the reference value, in response to (i) the processor determining that the running resistance is present, and (ii) the processor determining that the accelerator operation is being performed.

2. The driving assistance apparatus according to claim 1, wherein:
the processor determines that the running resistance is present in response to the vehicle travelling on an uphill road.

3. The driving assistance apparatus according to claim 2, wherein:
the processor determines that the running resistance is present in response to a bump being present on a road surface on which the vehicle is traveling.

4. The driving assistance apparatus according to claim 3, wherein:
the processor acquires a speed of the vehicle and an operating amount of the accelerator operation, and determines that the running resistance is present in response to the acquired speed being less than a speed corresponding to the acquired operating amount.

5. The driving assistance apparatus according to claim 3, wherein:
the processor acquires an operating amount of the accelerator operation, and sets the operation distance to a correction value that is less than the reference value, in response to (i) the processor determining that the running resistance is present, (ii) the processor determining that the accelerator operation is being performed, and (iii) the operating amount being less than a threshold.

6. The driving assistance apparatus according to claim 2, wherein:
the processor acquires a speed of the vehicle and an operating amount of the accelerator operation, and determines that the running resistance is present in response to the acquired speed being less than a speed corresponding to the acquired operating amount.

7. The driving assistance apparatus according to claim 2, wherein:
the processor determines whether the running resistance is present based on an acceleration of the vehicle in the travelling direction.

8. The driving assistance apparatus according to claim 2, wherein:
the processor acquires an operating amount of the accelerator operation, and sets the operation distance to a value that is less than that when the running resistance is not present, in response to (i) the processor determining that the running resistance is present, (ii) the processor determining that the accelerator operation is being performed, and (iii) the operating amount being less than a threshold.

9. The driving assistance apparatus according to claim 1, wherein:
the processor acquires a speed of the vehicle and an operating amount of the accelerator operation, and determines that the running resistance is present in response to the acquired speed being less than a speed corresponding to the acquired operating amount.

10. The driving assistance apparatus according to claim 9, wherein:
the processor acquires an operating amount of the accelerator operation, and sets the operation distance to a correction value that is less than the reference value, in response to (i) the processor determining that the running resistance is present, (ii) the processor determining that the accelerator operation is being performed, and (iii) the operating amount being less than a threshold.

11. The driving assistance apparatus according to claim 1, wherein:
the processor determines whether the running resistance is present based on an acceleration of the vehicle in the travelling direction.

12. The driving assistance apparatus according to claim 11, wherein:
the processor acquires an operating amount of the accelerator operation, and sets the operation distance to a correction value that is less than the reference value, in response to (i) the processor determining that the running resistance is present, (ii) the processor determining that the accelerator operation is being performed, and (iii) the operating amount being less than a threshold.

13. The driving assistance apparatus according to claim 1, wherein:
the processor acquires an operating amount of the accelerator operation, and sets the operation distance to a correction value that is less than the reference value, in response to (i) the processor determining that the running resistance is present, (ii) the processor determining that the accelerator operation is being performed, and (iii) the operating amount being less than a threshold.

14. The driving assistance apparatus according to claim 13, wherein:
the processor acquires a gradient of a road surface on which the vehicle is traveling, and sets the threshold to be greater as the gradient increases.

15. A driving assistance method performed by a driving assistance apparatus that operates a collision avoidance apparatus that is mounted in a vehicle based on a distance to an object that is positioned ahead of the vehicle in a travelling direction, the driving assistance method performing:
- determining whether running resistance that suppresses rolling of wheels forward in the travelling direction of the vehicle is present;
- determining whether an accelerator operation by a driver of the vehicle is being performed; and
- setting an operation distance that is a distance at which the collision avoidance apparatus is operated, wherein setting the operation distance comprises
  - setting the operation distance to a reference value in response to the running resistance being determined not to be present, and
  - setting the operation distance to a correction value that is less than the reference value, in response to (i) the running resistance being determined to be present, and (ii) the accelerator operation being determined to be performed.

* * * * *